April 6, 1954      K. H. DAHLKVIST      2,673,991
TRAILER BOAT
Filed June 18, 1951
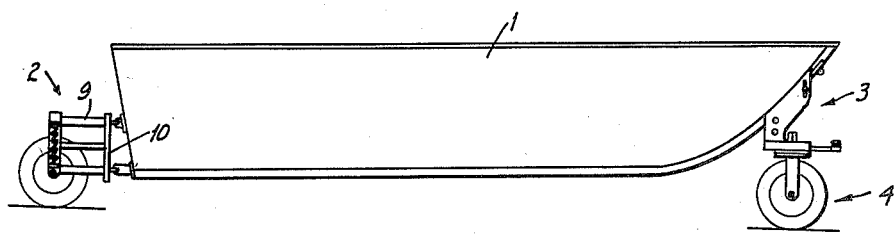
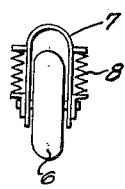
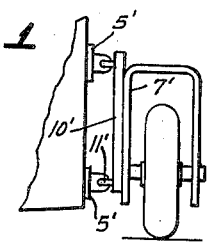
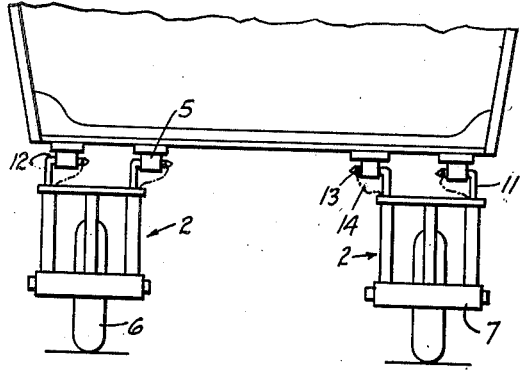
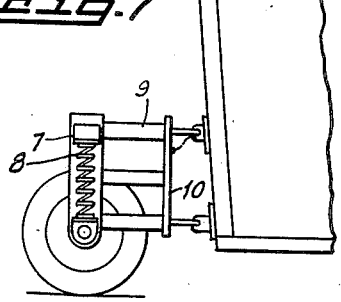
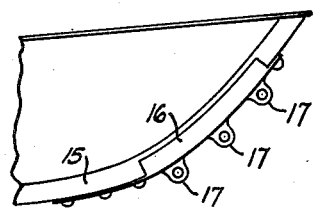
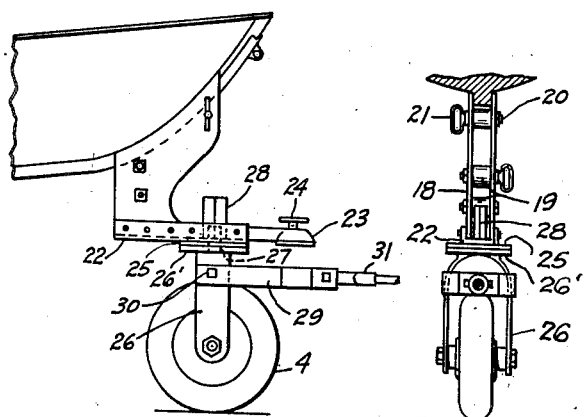
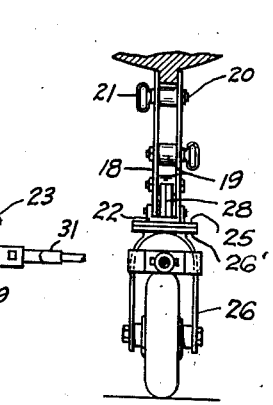
INVENTOR.
Karl H. Dahlkvist
BY
*A. Schapp*
ATTORNEY

Patented Apr. 6, 1954

2,673,991

UNITED STATES PATENT OFFICE 2,673,991

TRAILER BOAT

Karl H. Dahlkvist, Palo Alto, Calif.

Application June 18, 1951, Serial No. 232,202

3 Claims. (Cl. 9—1)

The present invention relates to improvements in a trailer boat, and its principal object is to provide a boat of the character described that may be readily hitched to a motor vehicle for overland travel.

More particularly it is proposed to provide a trailer boat that has rear wheels for supporting the rear portion thereof and a front bracket attachable to the conventional ball hitch on a motor vehicle.

It is further proposed to provide a trailer boat of the character described in which the rear wheels and the brackets are readily detachable so as to leave the boat clear for travelling in water.

It is a further object of the invention to provide means whereby a front wheel may be readily attached to the front bracket to aid in launching and landing operations.

It is additionally proposed to provide a readily detachable and expendable hitching rod whereby the boat may be readily attached to a motor vehicle standing at a distance therefrom.

It is a further object of the invention to provide an arrangement whereby the boat is mounted rather low with respect to the wheel to facilitate launching in shallow waters.

Again it is proposed to provide structural improvements in the mounting means for the wheels and the brackets to render the entire equipment very simple, inexpensive, and easy to handle.

And finally, it is proposed to arrange all the parts in such a manner that the attaching and detaching operations may be readily performed by a single person even where a rather heavy and bulky boat is concerned.

Further objects and advantages of my invention will appear as the specification proceeds, and the novel features of my invention will be fully defined in the claims attached hereto.

The preferred form of my invention is illustrated in the accompanying drawing, in which Figure 1 shows a side view of my trailer boat equipped with rear wheels and a front bracket and a front bracket supporting wheel, Figure 2, a plan view of the rear end of the boat on an enlarged scale, Figure 3, a side view of the rear end of the boat, Figure 4, a side view of the front end of the boat, Figure 5, a front view of the front end of the boat and supporting element with a hitching element and part of the boat structure omitted, Figure 6, a side view of the front portion of the boat without the attachment, Figure 7, a fragmentary rear view showing a rear wheel attached to the side of the boat and near the rear end thereof, and Figure 8, a rear elevation of the wheel and yoke structure shown in Figure 3.

While I have shown only the preferred form of my invention, I wish to have it understood that various changes and modifications may be made within the scope of the claims attached hereto without departing from the spirit of the invention.

Referring to the drawing in detail, the boat 1 may be of any suitable construction and is provided at its rear end with a pair of wheel supports 2 and at its front end with a hitching bracket 3 having a wheel support 4 detachably secured thereto.

In the form shown in Figures 1, 2 and 3 the rear wall of the boat has, for each of the wheel mountings, four eyelets 5 mounted thereon, preferably in the same vertical plane, with the openings of the eyelets presented horizontally.

Each wheel 6 has a yoke 7 mounted vertically over the axle thereof, preferably to springs 8, and each yoke has a number of horizontal spacing members 9 projecting forwardly therefrom, the forward ends of the spacing members supporting a vertical plate 10. Each plate has four prongs 11 projecting forwardly therefrom, and the forward ends of the prongs are bent at right angles to provide fingers 12 adapted for introduction into the four eyelets 5 on a sidewise movement of the wheel supported frame. The fingers may be held in the eyelets by pins 13 secured upon chains 14 anchored to the frame.

It will be seen that upon removal of the pins 13 the fingers may be readily slipped out of the eyelets for removal of the wheel supports 2.

At the forward end of the boat the keel 15 is reinforced by means of a channel 16 having three eyelets 17 projecting forwardly therefrom. The front hitching bracket 3 comprises in its principal features a pair of spaced plates 18 adapted to straddle the channel 16 and held in spaced relation by suitable spacers 19. The plates are formed with suitable apertures adapted to register with the two lowermost eyelets 17 and may be secured upon the eyelets by means of bolts and nuts 20 and 21, the nuts being preferably made in the form of enlarged handles as shown and being made to project from opposite sides of the plates so that they lend themselves for grasping by two men standing on opposite sides of the boat to facilitate lifting of the latter.

The upper eyelet 17 is made to clear the bracket and is adapted to have a heavy rod or bar passed therethrough which may be used for lifting the boat.

The bottom portions of the plates are secured upon a channel 22 which extends forwardly of the bracket and has a hitch element 23 mounted upon the forward end thereof, the hitch element being in the form of a spherical socket adapted to engage over a ball-shaped hitch element conventionally mounted upon the rear bumper of a motor vehicle and to be locked thereto, in a conventional manner, by operation of a screw 24.

Rearwardly of the hitch element 23 the channel 22 has a disc 25 mounted upon the under face or web thereof, and this disc is formed with a central opening passing through the bottom of the channel.

The front wheel 4 has a yoke 26 mounted upon the axle thereof, and this yoke carries, upon its upper end, a disc 26' adapted to be brought into registry with the disc 25. A pin or shank 27 rises centrally from the lower disc through the hole in the upper disc and in the channel and is threaded to receive a nut 28 for securing one disc upon the other. The pin 27 extends above the bottom of the channel only a very short distance to facilitate removal of the wheel, and the nut 28 is preferably made of unusual axial length to facilitate operation thereof.

The yoke 26 has a second yoke 29 removably secured thereon as at 30 and this yoke carries an extensible tie rod 31 by means of which it may be secured to a motor vehicle standing at a distance from the boat.

In the form shown in Figure 7 the rear wheels are secured upon the sides of the boat, near the rear end thereof. This makes it easier to handle the boat for attaching and detaching to a motor vehicle, while the form of Figure 1 has the advantage of better maneuverability in tight places. In the form of Figure 7 the eyelets 5' project from the side of the boat, and the plate 10' is secured upon the side of the axle-supported yoke 7', the plate carrying the prongs 11' adapted for sliding engagement in the eyelets.

In explaining the operation it may be assumed that the trailer boat as shown in Figure 1 is ready for connecting to a motor vehicle. The extensible rod 31, if it was used for landing the boat, has been removed so that the hitch element 23 is freely exposed. The front wheel holds the front end of the boat sufficiently high to bring the socket 23 above the height of the ball hitch on the motor vehicle. In completing the hitch, the motor vehicle is backed up to bring the ball underneath the socket. The bumper carrying the ball is then jacked up to lift the ball into the socket, whereupon the two elements are interlocked by operation of the screw 24. The bumper is then jacked a little higher to cause the front wheel to clear the ground surface, whereupon the nut 28 is turned to allow the wheel mounting to drop away from the bracket. Upon removal of the jack the front end of the boat is now firmly anchored to the motor vehicle for travel overland. It is apparent that this entire operation may be easily performed by a single person regardless of the size and weight of the boat, within reasonable limits.

For launching the boat the procedure is reversed. With the boat arriving at the edge of the water hitched to the motor vehicle as described, the operator jacks up the bumper, applies the front wheel mounting, unlocks the hitch by operation of the screw 24, and lowers the bumper which clears the boat. The latter is then pushed into the water, and as soon as the water takes the weight of the boat, the rear wheels may be readily removed by slipping the fingers 12 out of the eyelets 5, upon removal of the pins 13. The front bracket, with its wheel support, may also be readily slipped off the keel channel 16, upon removal of the two bolts 20.

When the operator is again ready to land, he re-applies the rear wheels and the bracket with its front wheel, while the boat is still floating and pulls the boat out of the water to the position shown in Figure 1, for hitching to the motor vehicle as described.

In case the beach is so steep as to make it impractical for one or two persons to pull the boat out of the water, the motor vehicle may be used for this purpose. In this case the front wheel yoke 26 may be hitched to the motor vehicle by use of the extensible rod 31.

If it is desired to lift the front end of the boat, two men, standing on opposite sides of the boat, may grasp the two nuts 21 or opposite ends of a bar passed through the upper eyelet 17 and lift the boat with comparative ease.

Where the rear wheels are secured upon the sides of the boat, as in Figure 7, the handling of the front end of the boat is facilitated, and in many cases the use of a jack may be dispensed with.

I claim:

1. In combination, a trailer boat having a series of eyelets projecting therefrom, with the eyelets disposed in the same plane, a wheel having a frame supported on the axle thereof, a plate forming part of the frame and having a series of prongs projecting therefrom in registering relation to the eyelets, the prongs being bent to present outer ends paralleling the plate and adapted for introduction into the eyelets on a sidewise movement of the plate, and means for locking the prongs in the eyelets.

2. In combination, a trailer boat having a series of eyelets projecting therefrom, with the eyelets disposed in the same plane, a wheel having a yoke vertically supported on the axle thereof, a plurality of rods projecting from the yoke parallel to the wheel and having a plate supported in the ends thereof, a series of prongs projecting from the plate in registering relation to the eyelets, the prongs being bent to present outer ends paralleling the plate and adapted for introduction into the eyelets on a sidewise movement of the plate, and means for locking the prongs in the eyelets.

3. In combination, a trailer boat having a downwardly projecting bracket secured upon the front end thereof, the bracket including a horizontal web projecting forwardly from the main body thereof, a disc mounted upon the bottom face of the web, a wheel having a yoke supported on the axle thereof, a second disc mounted on the yoke in supporting relation to the first disc, a shank rising centrally from the second disc and passing through the first disc and the web, and a nut threaded on the shank and bearing on the web for holding the two discs in bearing relation, the shank rising above the web only a short distance to allow the wheel support to drop away from the bracket upon a slight raising of the bracket after the nut has been removed.

(References on following page)

References Cited in the file of this patent

UNITED STATES PATENTS

| Number | Name | Date |
|---|---|---|
| 633,065 | Boulesque | Sept. 12, 1899 |
| 674,484 | Steward | May 21, 1901 |
| 1,029,093 | Taicher | June 11, 1912 |
| 1,134,672 | Davies | Apr. 6, 1915 |
| 1,204,975 | Hale | Nov. 14, 1916 |
| 1,343,650 | Snyder | June 15, 1920 |
| 1,754,407 | Stearman | Apr. 15, 1930 |
| 1,755,537 | Deisler | Apr. 22, 1930 |
| 2,159,395 | Mersereau | May 23, 1939 |
| 2,171,889 | Payson | Sept. 5, 1939 |
| 2,227,725 | Laddon | Jan. 7, 1941 |
| 2,235,034 | Molloy | Mar. 18, 1941 |
| 2,294,110 | Donaldson | Aug. 25, 1942 |
| 2,410,570 | Davis | Nov. 5, 1946 |
| 2,424,641 | Swanson | July 29, 1947 |
| 2,463,746 | Conley | Mar. 6, 1949 |
| 2,475,454 | Merrill | July 5, 1949 |
| 2,484,346 | Iorns | Oct. 11, 1949 |
| 2,518,602 | Crook | Aug. 15, 1950 |
| 2,521,819 | Baer | Sept. 12, 1950 |

FOREIGN PATENTS

| Number | Country | Date |
|---|---|---|
| 510,392 | Great Britain | July 31, 1939 |